May 8, 1962 G. L. MEYERS 3,033,101
PAPER BAKE PAN
Filed Dec. 30, 1959 2 Sheets-Sheet 2

| United States Patent Office | 3,033,101
|---|---|
| | Patented May 8, 1962 |

3,033,101
PAPER BAKE PAN
George L. Meyers, Menasha, Wis., assignor to American Can Company, New York, N.Y., a corporation of New Jersey
Filed Dec. 30, 1959, Ser. No. 862,909
1 Claim. (Cl. 99—439)

This invention relates to a paper bake pan lined internally with metal foil suitable for baking bakery products therein such as angel cake.

In baking angel cake, it is generally the practice to use rounded metal bake pans having a central tubular core so as to produce a round cake having a central cylindrical hole. The angel cake is generally shipped by bakeries to the consumer outlets after being removed from the metal bake pans and packaged in paper cartons. Sometimes the baked cake is sold with the metal bake pan. In either case, considerable difficulty and expense is involved. When the baked angel cake is removed from the metal bake pan at the bakery, considerable labor is required in cleaning the metal pans for reuse. If the angel cake is sold in the metal bake pan, considerable additional cost is obviously involved.

The present invention overcomes these difficulties by providing an inexpensive angel cake bake pan made of cardboard or other sheet material internally lined with metal foil and having an opening in the bottom of the pan for receiving a tubular core extending for substantially the height of the pan. It is possible to bake angel cake or other bakery products in such pan to provide a central tubular hole in the baked cake. The baked cake can be sold to the consumer in the bake pan which can be discarded by the consumer. The present bake pan construction thus provides an inexpensive, disposable baking pan which also serves as a shipping container. The entire angel cake can be readily removed from the pan or it can be cut and removed in smaller portions. When the present bake pan is made of cardboard the exposed outer surfaces can be printed with suitable designs and indicia so as to present a very pleasing appearance. It can also be overwrapped with suitable transparent sheet materials, such as cellophane, to protect the cake against contamination before it reaches the consumer.

Figure 1:
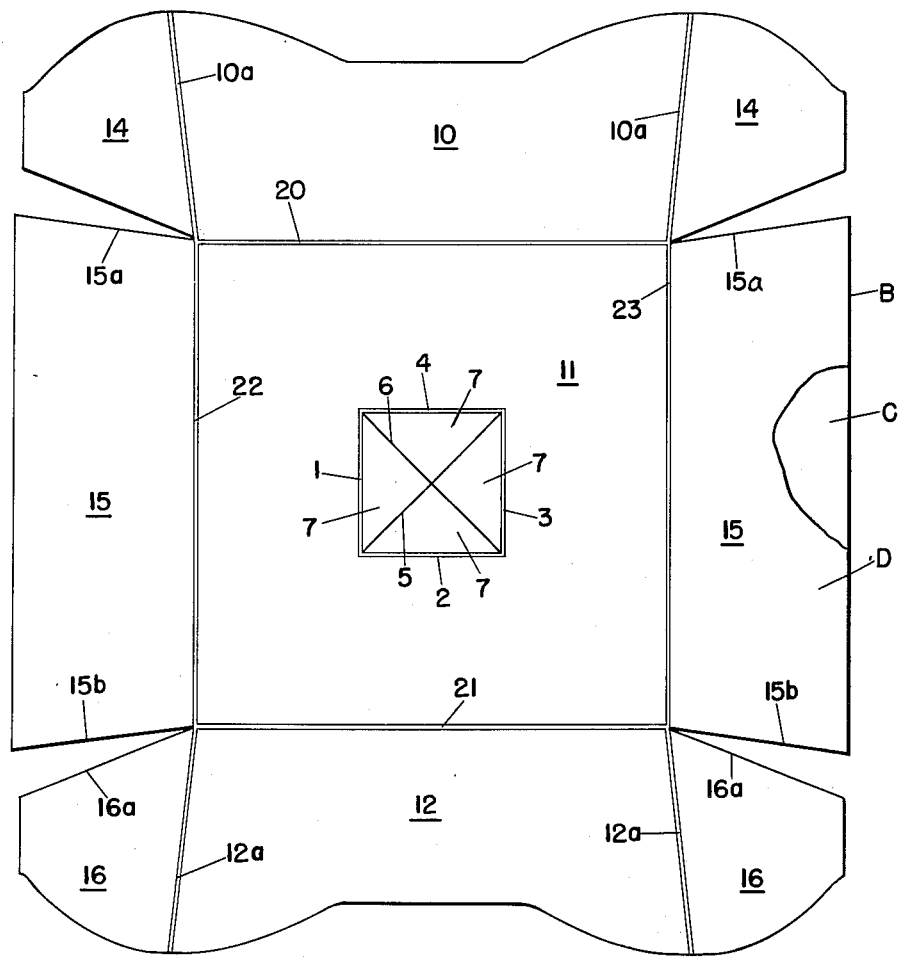
Figure 2:
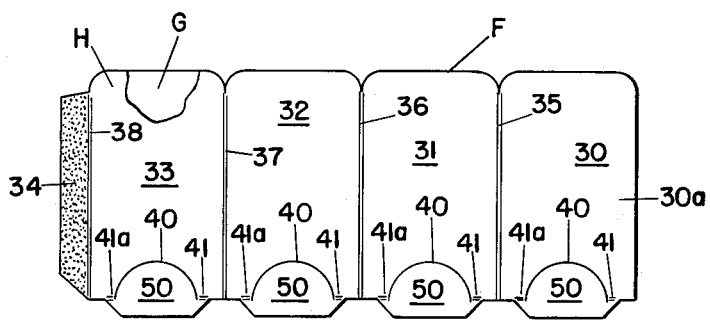
Figure 3:
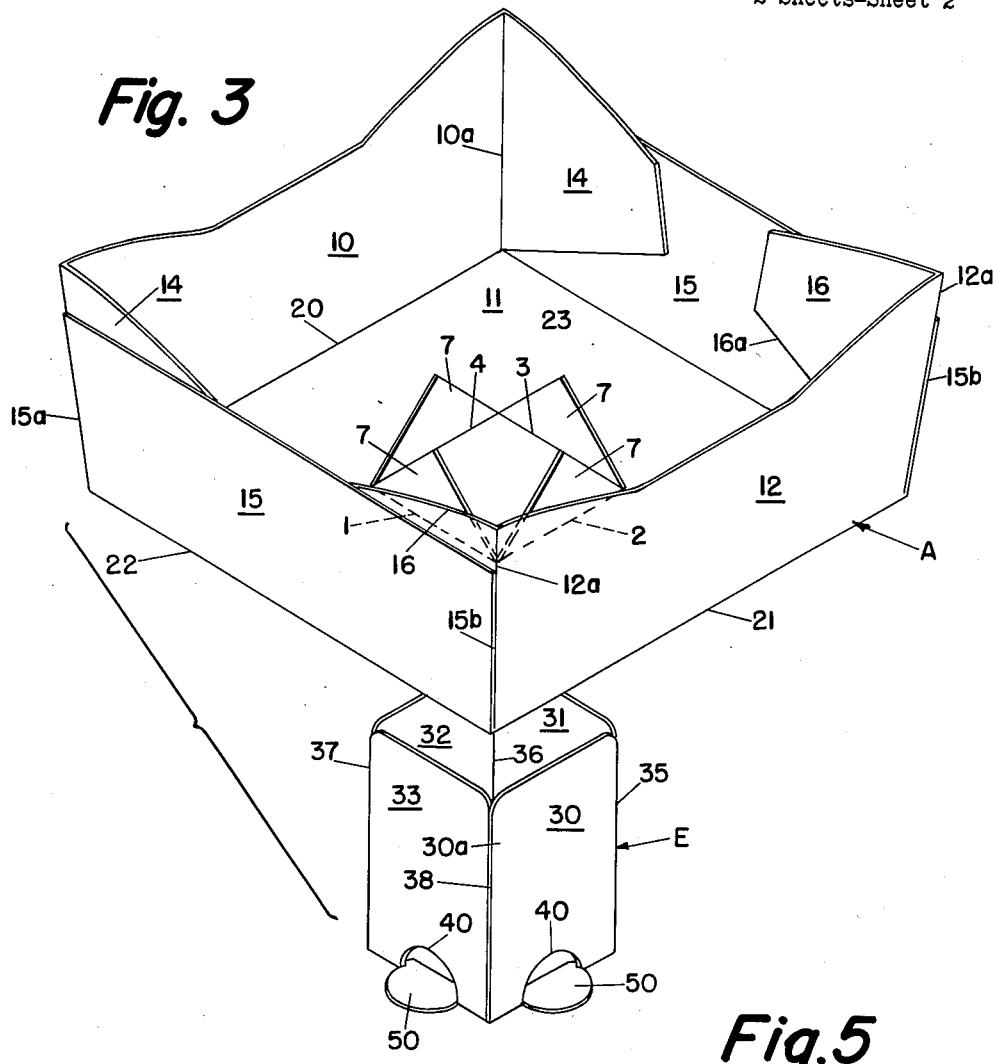
Figure 4:
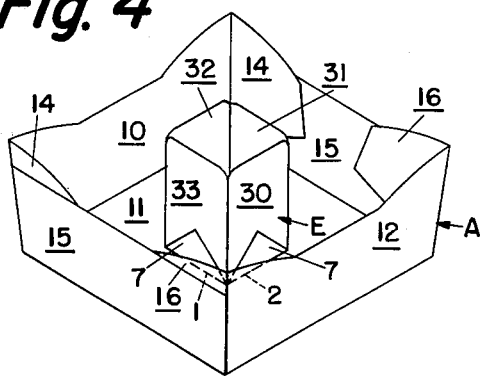
Figure 5:
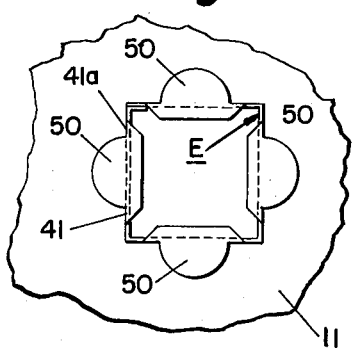

Further advantages and details of the invention will be apparent from the following description and accompanying drawings, wherein FIGURE 1 is a plan view of a flat blank of sheet material, suitable cut and scored, from which the bake pan is made, FIGURE 2 is a plan view of a flat blank, suitably cut and scored, from which the central tubular member is made, FIGURE 3 is an exploded perspective view of the set-up bake pan and central tubular member, FIGURE 4 is a perspective view of the assembled bake pan and central tubular core member, and FIGURE 5 is a fragmental bottom plan view of the assembly shown in FIGURE 4.

Referring to the drawings, the receptacle portion A of the bake pan is formed preferably from a single blank B, shown in FIGURE 1, made of flexible sheet material, such as paperboard C, lined on one face with a suitable metal foil D, such as aluminum foil, adhered by suitable adhesive. The blank is suitably cut and scored along score lines 20, 21, 22 and 23 to form a bottom wall 11 and hinged opposed side walls 10 and 12 and opposed side walls 15. Side wall 10 is provided with flaps 14 hinged to each end thereof along score lines 10a. Side wall 12 is provided with end flaps 16 hinged at each end thereof along score lines 12a. Side walls 15 are provided with inclined cut lines 15a and 15b separating same from adjacent end flaps 14 and 16, respectively. The bottom wall 11 is provided at its medial area with intersecting score lines 1, 2, 3 and 4 which form a square of suitable dimensions, and diagonal intersecting cut lines 5 and 6 extending within the square from each of the corners thereof to form four hinged triangular tabs 7.

The receptacle portion A is formed from the previously described blank by folding the side walls 10 and 12, and opposed side walls 15 upwardly of the bottom wall 11 with the metal foil lining D facing inwardly of the receptacle, and then fastening end flaps 14 and 16 to adjacent inner portions of side walls 12 and 15, as shown in FIGURES 3 and 4, by suitable adhesive or staples, so as to position the side walls 10, 12 and 15 at an outwardly angle inclined whereby the side walls present an upward taper, as shown in FIGURES 3 and 4. Such taper facilitates removal of the cake baked in the receptacle portion.

The tubular core member E of the receptacle portion is formed preferably from a single blank F, shown in FIGURE 2, made of flexible sheet material, such as cardboard G, lined on one face thereof with metal foil H, such as aluminum foil, adhered by suitable adhesive. The blank is scored along lines 35, 36, 37 and 38 to form hinged side panels 30, 31, 32 and 33 and a glue panel 34. One end of each of the side panels is provided with a curvilinear cut score 40 terminating at each end thereof in score lines 41 and 41a. In forming the tubular core member E, combined panels 33 and 34 are folded over along score line 37, and panel 30 is folded along score line 35 so as to bring its inner marginal portion into face contact with glue panel 34 which is provided on its outer face with suitable adhesive. The panels are folded so as to present the foil lining H outwardly. The tubular core E can be shipped in flat folded condition to the bakery and is set up merely by folding the side panels 30, 31, 32 and 33 at right angles to each other, as shown in FIGURE 3. Tabs 50 are then folded outwardly on their spaced score lines 41 and 41a, as shown in FIGURE 3, so as to place tabs 50 in outwardly extending position. It will be obvious that to provide the function explained in greater detail hereinafter, tabs 50 are essentially formed by a hinge connection thereof to the bottom of the side panels or walls, such as hinge connection 41, plus a cut line extending from an end of the hinge connection upwardly into the core member side panel and thence returning to a point co-linear with an extension of the hinge connection.

In assembling the tubular core E within the receptacle portion A, the triangular tabs 7 are merely pushed inwardly by the fingers or other suitable means so as to extend within the receptacle, thereby forming a rectangular opening in the bottom wall 11, and the tubular core E is then inserted through the rectangular opening in the bottom wall 11 of the receptacle portion, as shown in FIGURE 4, until tabs 50 are brought into flat face contact with the outer portions of the bottom wall adjacent the rectangular opening, as shown in FIGURE 5. At the same time the triangular tabs 7 will come into frictional contact with the respective panel portions of the tubular core member E adjacent the lower bottom wall of the receptacle. The core member E will thus be suitably retained within the receptacle portion. The width of the panels 30 to 33 is dimensioned so that the core E can be inserted through the rectangular opening provided in the bottom wall 11 and the lower end of the core member E is frictionally retained in the opening. If desired, the score lines 35 to 38 of the blank shown in FIGURE 2 may be inclined with respect to the lower edge provided with the hinged tab portion 50 so that the core member will have a slight upward taper, thereby ensuring greater frictional contact at the edges of the rectangular opening. Also such taper will facilitate removal of the baked cake.

While the preferred embodiment which has been illustrated and described comprises a receptacle portion having a rectangular opening, and a core member having a rectangular cross section, it will be perfectly obvious that this opening and corresponding cross section of the core member might be of another configuration, for example, hexagonal, or of other polygonal shape. Also, particularly to facilitate removal of the baked cake from the carton, the walls of the core member might be tapered inwardly upwardly, to complement an outwardly upwardly tapering of the receptacle portion.

It will be apparent that modifications and changes may be made in the described illustrative embodiment of the invention which are intended to be included within the scope of the appended claim.

I claim:

A bake pan comprising a receptacle portion formed of flexible sheet material and having a bottom wall and side walls, said bottom wall being provided with intersecting score lines to form a medially positioned polygon, cut lines extending from each of the corners of the polygon toward the center thereof to form bottom wall tabs hinged to the bottom wall along said score lines, said tabs being folded upwardly within said receptacle portion to provide a polygonal opening through said bottom wall, and a complementary polygonal tubular core member having hinged side panels corresponding to the sides of said polygonal opening extending upwardly through said opening to be positioned substantially within said receptacle portion, the horizontal cross-sectional contour of the lower end of said core member being of substantially the same dimensions as said polygonal opening to permit frictional retention therein, said tabs frictionally contacting the exterior side panels of said core member, said core member being provided with restraining means at its lower end including at least two restraining tabs hinged to the lower end of at least two opposed side panels and positioned parallel to said bottom wall and contacting the exterior surface thereof to restrain the bottom end of said core member from movement upwardly through said opening, said restraining tabs being defined by said hinge connection thereof to a side panel, said hinge connection of each of said restraining tabs to a side panel being in two spaced portions, adjacent ends thereof being connected by a continuous cut line extending into the lower end of the side panel to which the restraining tab is connected and defining a tab portion from said side panel, said tab portion being positioned substantially perpendicularly to and outwardly of the side panel to which it is hinged and in flat face contact with the exterior surface of the bottom wall adjacent said opening.

References Cited in the file of this patent

UNITED STATES PATENTS

| | | |
|---|---|---|
| 1,505,999 | Gereke | Aug. 26, 1924 |
| 1,531,569 | Rade | Mar. 31, 1925 |
| 1,727,257 | Stratton et al. | Sept. 3, 1929 |
| 2,097,708 | Trost | Nov. 2, 1937 |
| 2,407,118 | Waters | Sept. 3, 1946 |
| 2,758,711 | Manners | Aug. 14, 1956 |
| 2,759,656 | Abrams | Aug. 21, 1957 |

FOREIGN PATENTS

| | | |
|---|---|---|
| 232,071 | Great Britain | Apr. 16, 1925 |